United States Patent
Wohlschlager et al.

(10) Patent No.: US 11,234,061 B2
(45) Date of Patent: Jan. 25, 2022

(54) COMMUNICATION DEVICE FOR WIRELESSLY COMMUNICATING WITH A SENSOR

(71) Applicant: KONINKLIJKE PHILIPS N.V., Eindhoven (NL)

(72) Inventors: Markus Wohlschlager, Sindelfingen (DE); Hansjoerg Geywitz, Kusterdingen (DE); Daniel Gal, Boeblingen (DE); Andre Bigalke, Boeblingen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/054,032

(22) PCT Filed: Apr. 30, 2019

(86) PCT No.: PCT/EP2019/060988
§ 371 (c)(1),
(2) Date: Nov. 9, 2020

(87) PCT Pub. No.: WO2019/214989
PCT Pub. Date: Nov. 14, 2019

(65) Prior Publication Data
US 2021/0235172 A1 Jul. 29, 2021

(30) Foreign Application Priority Data
May 7, 2018 (EP) .................................... 18171073

(51) Int. Cl.
*H04Q 9/00* (2006.01)
(52) U.S. Cl.
CPC ........... *H04Q 9/00* (2013.01); *H04Q 2209/40* (2013.01); *H04Q 2209/82* (2013.01); *H04Q 2209/845* (2013.01)

(58) Field of Classification Search
CPC .. H04Q 9/00; H04Q 2209/40; H04Q 2209/82; H04Q 2209/845
See application file for complete search history.

(56) References Cited

U.S. PATENT DOCUMENTS 6,564,036 B1 * 5/2003 Kasapi .................. H04W 16/28
455/1
7,519,043 B2 4/2009 Porter et al.
(Continued)

FOREIGN PATENT DOCUMENTS

WO 2017007926 A1 1/2017

OTHER PUBLICATIONS

International Search Report and Written Opinion, International Application No. PCT/EP2019/060988, dated Jun. 24, 2019.

*Primary Examiner* — Amine Benlagsir

(57) ABSTRACT

The invention relates to a communication device (8) for wirelessly communicating with a sensor (4). The communication device (8) comprises a receiver for receiving signals, an amplifier for amplifying the received signals, a transmitter for transmitting signals, and a controller. The controller is operable in a first mode in which signal strength values are determined over time, which are indicative of a strength of an amplified received signal, and in a second mode in which signal transmission and reception are controlled based on the determined signal strength values. The determined signal strength values can be indicative of, for instance, a saturation of the amplifier caused by a transmission operation of another, neighboring communication device such that, by considering the determined signal strength values, the transmission carried out by the communication device (8) can be synchronized with the corresponding operation of the neighboring communication device. This can lead to reduced disturbances.

14 Claims, 10 Drawing Sheets

(56) References Cited

U.S. PATENT DOCUMENTS

| | | |
|---|---|---|
| 8,705,387 B2 | 4/2014 | Falck et al. |
| 9,451,626 B2 | 9/2016 | Amini et al. |
| 9,742,481 B1* | 8/2017 | Jorgovanovic .......... H04L 43/16 |
| 2006/0173499 A1* | 8/2006 | Hampton ............. A61H 31/005 |
| | | 607/5 |
| 2006/0264762 A1* | 11/2006 | Starr ................... A61M 16/104 |
| | | 600/483 |
| 2009/0180451 A1 | 7/2009 | Alpert et al. |
| 2013/0010766 A1 | 1/2013 | Sadek et al. |
| 2013/0303214 A1 | 11/2013 | Ahmadi |
| 2015/0049644 A1* | 2/2015 | Lee ....................... H04W 84/20 |
| | | 370/256 |
| 2016/0242685 A1* | 8/2016 | DeHennis ............ A61B 5/0002 |
| 2017/0215758 A1* | 8/2017 | Schepis ................ A61B 5/4848 |
| 2018/0153430 A1* | 6/2018 | Ang ....................... A61B 5/389 |
| 2018/0359729 A1* | 12/2018 | Okumura ............. H04B 17/318 |

\* cited by examiner

COMMUNICATION DEVICE FOR WIRELESSLY COMMUNICATING WITH A SENSOR

This application is the U.S. National Phase application under 35 U.S.C. § 371 of International Application No. PCT/EP2019/060988, filed on 30 Apr. 2019, which claims the benefit of European Application Serial No. 18171073.2, filed 7 May 2018. These applications are hereby incorporated by reference herein.

FIELD OF THE INVENTION

The invention relates to a communication device for wirelessly communicating with a sensor like a sensor to be arranged on the abdomen of a pregnant woman for measuring the heart activity of an unborn child. The invention relates further to a patient monitor for monitoring a patient, which comprises the communication device, and to a sensing system comprising the communication device and the sensor. The invention also relates to a method for operating the communication device and to a computer program for controlling the communication device for wirelessly communicating with the sensor.

BACKGROUND OF THE INVENTION

For monitoring a patient, wireless sensors can be arranged on the patient, which measure physiological signals and transmit the measured physiological signals to a communication device. The communication device receives the physiological signals and the received physiological signals are used for determining physiological values like a heart rate which can be output to a user.

If in close proximity to the sensors and the communication device, i.e. in close proximity to this first sensing system, a second sensing system is used, which also comprises several sensors for measuring physiological signals and a communication device, the communication between the sensors and the communication device of the first sensing system can be disturbed by transmission operations of the second sensing system and vice versa, even if the first and second sensing systems communicate at different channels within a frequency band. This disturbance can reduce the quality of transmitting signals from the sensors to the respective communication device and hence of the respective patient monitoring procedure.

SUMMARY OF THE INVENTION

It is an object of the present invention to provide a communication device which allows for an improved wirelessly communication with a sensor, if another communication device for wirelessly communicating with another sensor is in close proximity to the communication device. It is a further object of the present invention to provide a patient monitor for monitoring a patient, which comprises the communication device, and a sensing system comprising the communication device and the sensor. Moreover, it is an object of the present invention to provide a method for operating the communication device and a computer program for controlling the communication device.

In a first aspect of the present invention a communication device for wirelessly communicating with a sensor is presented, wherein the communication device comprises:
a receiver for receiving signals,
an amplifier for amplifying the received signals,
a transmitter for transmitting signals,
a controller for controlling the receiver and the transmitter, wherein the controller is operable in a first mode in which the controller controls the receiver for receiving signals over time and determines signal strength values over time, wherein a signal strength value is indicative of the strength of the amplified received signal, and in a second mode in which the controller controls the transmitter for transmitting signals to the sensor and the receiver for receiving signals based on the determined signal strength values, wherein the controller is adapted to determine a temporal position of a beginning of a predefined pattern in the signal strength values, which have been determined over time, and to control the transmitter for transmitting signals to the sensor and the receiver for receiving signals from the sensor based on the determined temporal position.

If besides the communication device, which can be regarded as being a first communication device, a further, second communication device is in close proximity to the first communication device, a transmission of signals by the second communication device can lead, for instance, to a saturation of the amplifier of the first communication device, distortions, et cetera, which in turn are visible in the signal strength values determined, i.e. measured, over time. Thus, by observing the signal strength values, which are indicative of the strength of the signal received and amplified by the first communication device, over time an indication can be provided which indicates when the second communication device transmits signals. This allows the controller of the first communication device to control its receiver such that it does not receive signals while the second communication device transmits signals to a sensor assigned to this second communication device, thereby ensuring that the receptions of signals by the first communication device is not adversely influenced by a transmission of signals by the second communication device. In fact, the controller can control the receiver and transmitter of the first communication device such that the transmission of signals and the receiving of signals carried out by the first communication device is synchronized with the transmission of signals and the receiving of signals carried out by the second communication device, in order to ensure that, if one of the two communication devices is transmitting signals, the other of the two communication devices is not receiving signals. This allows for a reduced likelihood of disturbing the communication between the first communication device and the sensor assigned to the first communication device by a communication between the second communication device and the sensor assigned to the second communication device and vice versa.

Preferentially, the controller is configured to determine received signal strength indicator (RSSI) levels as the signal strength values. It has been found that by using the RSSI level as the signal strength value transmission time periods of the second communication device can very reliably be determined, thereby further increasing the likelihood that the communication with the first communication device is not disturbed by the communication with the second communication device and vice versa.

Moreover, preferentially the controller and the receiver are configured such that in the first mode and in the second mode the signals are received by using a same frequency channel within a same frequency band. Thus, it is not necessary to use in the first mode, for instance, a channel at which the second communication device communicates for determining when the second communication device has its transmission time period. The likelihood of disturbance can therefore be reduced with relatively low technical efforts.

The controller is adapted to determine a temporal position of a beginning of a predefined pattern in the signal strength values, which have been determined over time, and to control the transmitter for transmitting signals to the sensor and the receiver for receiving signals from the sensor based on the determined temporal position. In particular, the controller is configured such that the determination of the temporal position includes determining when at least one of the following conditions is fulfilled a) a signal strength value is larger than a predefined first threshold and b) a derivative of the signal strength values is larger than a predefined second threshold value. The controller can be adapted to use single signal strength values or average signal strength values for determining whether at least one of these conditions is fulfilled. In particular, it is preferred to use average signal strength values averaged over predetermined time periods, because they are less sensitive to fluctuations. Moreover, the controller can be configured to control the receiver and the transmitter such that during a predefined transmission time period signals are transmitted from the transmitter to the sensor and during a later predefined reception time period signals from the sensor are received by the transmitter, wherein the transmission time period and the reception time period are parts of a frame time period which is continuously repeated, wherein the beginnings of the repeating frame time period are aligned with the determined temporal position plus a multiple of the temporal length of the frame time period. Here it is assumed that a second communication device in the vicinity of the communication device, which might be regarded as being a first communication device, has the same length of the frame time period and the temporal locations and lengths of the transmission time period and the reception time period within the frame time period are also the same for the second communication device. This allows for a further improved synchronization of the transmission and reception periods of the communication device, i.e. of the first communication device, with another, second communication device being in close proximity to the first communication device. The length of the frame time period and the temporal locations and lengths of the transmission time period and the reception time period within the frame time period preferentially define the predefined pattern in the signal strength values. In an embodiment the communication device further comprises a charging unit for charging a sensor, wherein the controller is configured to be operated in the first mode, if the charging unit charges a sensor. This allows determining the signal strength values over time while the first communication device is very likely not used for receiving signals from the sensor, because the sensor is charged. Thus, the determination of the signal strength values over time can be carried out, without using any intended sensing time.

The amplifier is preferably a low noise amplifier. Moreover, the communication device can communicate with one sensor or with several sensors, i.e. the use of the wording "a sensor" and "the sensor" does not exclude that the communication device communicates with several sensors. In particular, the communication device is preferentially configured to communicate with several sensors in a star configuration. The controller is preferentially configured to control the receiver and the transmitter such that the communication with the sensors uses a time division multiplexing (TDM) technique or a time division multiple access (TDMA) technique. This allows for a very reliable and robust communication between the sensors and the communication device.

The communication device is preferentially a base station, but it can also be any other communicative device. Moreover, also more than two communication devices can be present, wherein these communicative devices can automatically synchronize each other such that they transmit and receive at the same times. For instance, if more than two communicative devices are used in close proximity, at first, one of them might be operated in the second mode, i.e. this communication device might communicate with the sensor assigned to this communication device, and the other communication device might be operated in the first mode, which might also be regarded as being a listening mode, in which they observe their respective received signal strength values over time, in order to detect the transmission and reception time periods of the communication device being operated in the second mode. Then, the other communication devices can be operated in the second mode in which they can transmit and receive in accordance with the signal strength values measured over time while they were operated in the first mode.

The communication device can comprise a switch for allowing a user to switch the operation of the communication device from the first mode to the second mode and vice versa. The switch can be the switch which is used for switching from a standby mode to a normal operation mode, wherein in this case in the standby mode the communication device is listening, i.e. in the first mode, and in the normal operation mode the communication device is in the second mode. The controller can also be configured to determine the signal strength values over time during the second mode, configured to determine if the determined signal strength values are larger than a predefined signal strength threshold and/or configured to determine if the determined signal strength values have reached their maximum, and configured to switch from the second mode to the first mode depending on whether the determined signal strength values are larger than the predefined signal strength threshold and/or depending on whether the determined signal strength values have reached their maximum. In particular, the controller is configured to automatically switch from the second mode to the first mode, if the determined signal strength values are larger than the predefined signal strength threshold and/or if the determined signal strength values have reached their maximum, respectively. In an embodiment the signals are transmitted via a radio frequency link using digital data package transmission. The controller can be configured to determine a data package loss over time in the second mode, configured to determine if the determined signal strength values are larger than the predefined signal strength threshold and/or configured to determine if the determined signal strength values have reached their maximum, configured to determine if the data package loss is larger than a predefined data package loss threshold, and configured to automatically switch from the second mode to the first mode, a) if the determined signal strength values are larger than the predefined signal strength threshold and/or if the determined signal strength values have reached their maximum, respectively, and b) if the data package loss is larger than the predefined data package loss threshold. The thresholds can be predetermined by calibration. This allows the communication device to determine when it is not synchronized anymore with one or more other communication devices in close vicinity, wherein then the synchronization process is carried out again by operating the controller in the first mode.

In an embodiment the controller is configured to, if operated in the first mode, determine a variation value being indicative of a variation of average signal strength values, wherein a respective average signal strength value is the average of the signal strength values between an increase of the signal strength values having a slope being larger than a predefined slope threshold and a following decrease of the signal strength values having a negative slope with an absolute value being larger than the predefined slope threshold, and to use the signal strength values determined over time for the control in the second mode only, if the variation value is smaller than a predefined variation threshold. The slope threshold can be predetermined by calibration. Thus, if there are strong fluctuations in the signal strength values, which might be caused by a further communication device operating in a larger distance, the signal strength values might not be suitable for synchronization and hence are preferentially not used.

In a further aspect of the present invention a patient monitor for monitoring a patient is presented, wherein the patient monitor comprises:
- a communication device as defined in claim 1 for wirelessly communicating with a sensor being configured to measure and transmit signals being indicative of a physiological property of the patient to the communication device,
- a processor for determining physiological values based on the signals transmitted from the sensor to the communication device, and
- an output unit for outputting the determined physiological values.

In another aspect of the present invention a sensing system is presented, wherein the sensing system comprises a communication device for wireless communicating with a sensor as defined by claim 1, and the sensor. The sensor is preferentially configured to measure a physiological property of a person. The sensor can be, for instance, an ultrasound sensor, a pressure sensor, a blood oxygen sensor, an electrocardiography sensor, et cetera. For instance, the sensor can be a Doppler ultrasound sensor configured to be attached to a pregnant woman and to measure a heart activity of an unborn child.

In a further aspect of the present invention a method for operating a communication device for wirelessly communicating with a sensor is presented, wherein the method comprises:
- operating the controller of a communication device as defined in claim 1 in a first mode, wherein the receiver of the communication device receives signals over time and determines signal strength values, which are indicative of the strength of the amplified received signal, over time,
- operating the controller of the communication device in a second mode, wherein the transmitter of the communication device transmits signals to the sensor and the receiver of the communication device receives signals which have been transmitted from the sensor to the communication device based on the signals transmitted from the sensor to the communication device, wherein the transmitting of the signals from the communication device to the sensor and the receiving of the signals from the sensor by the communication device are controlled based on the determined signal strength values, wherein the controller determines a temporal position of a beginning of a predefined pattern in the signal strength values, which have been determined over time, and controls the transmitter for transmitting signals to the sensor and the receiver for receiving signals from the sensor based on the determined temporal position.

In another aspect of the present invention a computer program for controlling a communication device for wirelessly communicating with a sensor is presented, wherein the computer program comprises program code means for causing a communication device as defined in claim 1 to carry out the steps of the method as defined in claim 13, when the computer program is run on a computer controlling the communication device.

It shall be understood that the communication device of claim 1, the patient monitor of claim 8, the sensing system of claim 10, the method of claim 13 and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
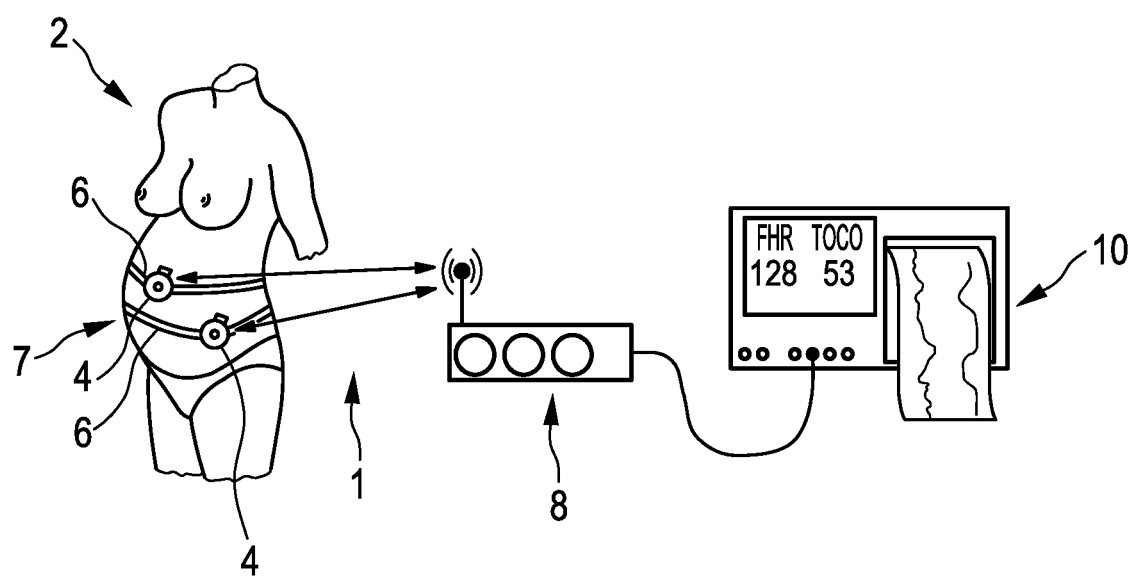
FIG. 1 shows schematically and exemplarily a sensing system comprising a communication device for wirelessly communicating with an ultrasound Doppler sensor and a TOCO sensor and a patient monitor.

FIG. 1 shows schematically and exemplarily an embodiment of a sensing system comprising sensors and a communication device being a base station for wirelessly communicating with the sensors. In this embodiment the sensors 4 are arranged on the abdomen 7 of a pregnant woman 2, wherein the sensors 4 are held in place by using belts 6. The sensors 4 include a Doppler ultrasound sensor for measuring Doppler ultrasound signals being indicative of the heart activity of the unborn child and a TOCO sensor for measuring TOCO signals being indicative of uterine contractions. The measured are transmitted to the base station 8 which further transmits the received signals to a patient monitor 10 which is configured to determine values being indicative of the heart activity of the unborn child and of the uterine contractions based on the received signals and to output the determined values. In this embodiment the determined value being indicative of the heart activity is the fetal heart rate (FHR) and the value being indicative of the uterine contractions is the TOCO value. The determined values can be output on a display. However, they can also be output in another way. For instance, they can be printed. The patient monitor 10 can also be adapted to provide an alarm, if the determined values are outside of predefined value ranges. It should be noted that, although FIG. 1 also shows two sensors 4, the base station 8 could also communicate with more than two sensors 4 or with one sensor 4 only. If only one sensor is used, this sensor could be a multi-parameter sensor for measuring several physiological properties like the fetal heart rate, the maternal heart rate, uterine contractions, temperature, et cetera. In this case several corresponding measurement elements would be integrated in a single sensor.

Figure 2:
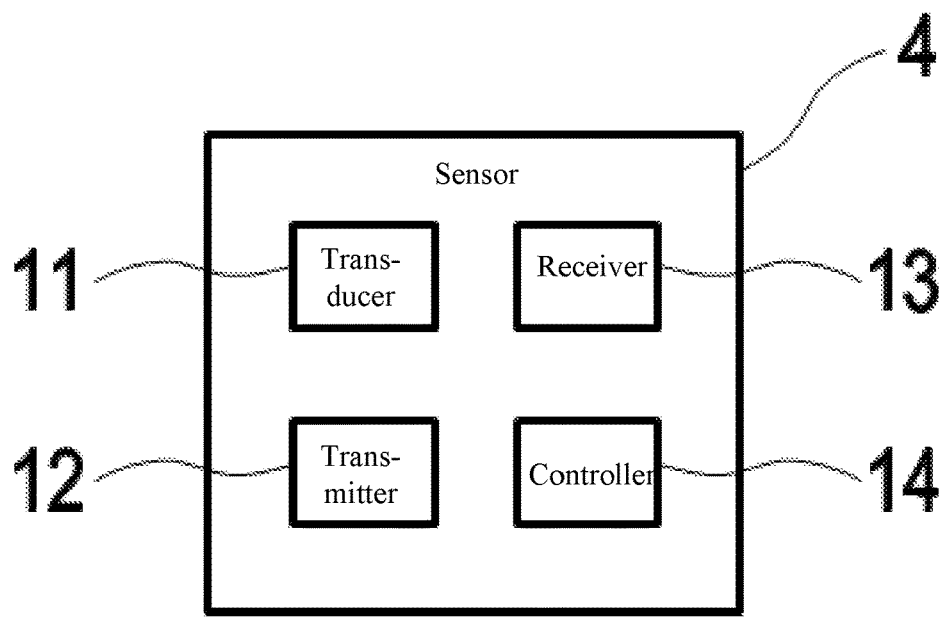
FIG. 2 shows schematically and exemplarily a sensor of the sensing system.

FIG. 2 illustrates schematically and exemplarily some components of one of the sensors 4. The sensor comprises a Doppler ultrasound transducer 11, a transmitter 12 for transmitting the measured Doppler ultrasound signal to the base station 8, a receiver 13 for receiving signals from the base station 8 and a controller 14 for controlling the different components of the sensor. The sensor 4 can comprise further components like amplifiers, a processor, et cetera, which are not shown in FIG. 2 for clarity reasons.

Figure 3:
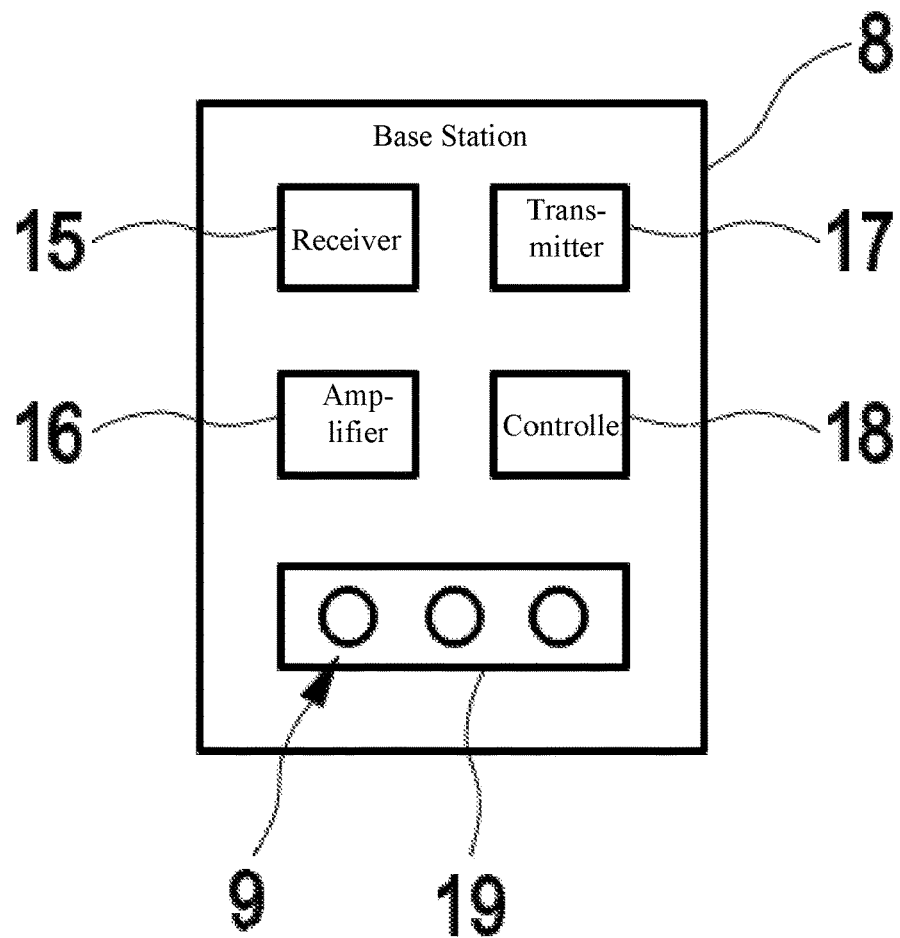
FIG. 3 shows schematically and exemplarily the communication device of the sensing system.

FIG. 3 illustrates schematically and exemplarily components of the base station 8. The base station 8 comprises a receiver 15 for receiving signals, an amplifier 16 for amplifying the received signals, a transmitter 17 for transmitting signals, and a controller 18 for controlling the different components of the base station 8. In particular, the controller 18 is configured to be operated in a first mode in which the controller 18 controls the receiver 15 for receiving signals over time and determines signal strength values over time, which are indicative of the strength of the amplified received signal, and in a second mode in which the controller 18 controls the transmitter 17 for transmitting signals to the sensors 4 and the receiver 15 for receiving signals based on the determined signal strength values. In this embodiment the controller 18 is configured to determine an RSSI level as the respective signal strength value. Moreover, the base station 8 is configured such that in the first mode and in the second mode the signals are received by using a same channel within a same frequency band, the amplifier 16 is a Low Noise Amplifier (LNA), and the base station 8 and the sensors 4 are configured to communicate in a star configuration, wherein a TDMA technique is used. Also the base station 4 can comprise further components which are not shown in FIG. 3 for clarity reasons.

Preferably in the second mode the controller 18 controls the base station 8 such that the transmitter 17 periodically sends a beacon signal which initially serves to synchronize the sensors 4 involved in the network, i.e. in the sensing system 1. The beacon signal also contains time information for each individual sensor 4 defining the time of access to the communication channel, i.e. defining when the respective sensor 4 should send the respective measurement signal to the base station 8, wherein these times of access are defined with respect to a frame, i.e. with respect to a frame time period. The in this way allocated time slots can be changed dynamically by the base station 8 from frame to frame by modifying the time information in the respective beacon signal accordingly. If a sensor 4 cannot receive a beacon signal from the base station 8 for any reason, the respective sensor 4 automatically stops transmitting. This communication protocol is also illustrated in FIG. 4.

Figure 4:
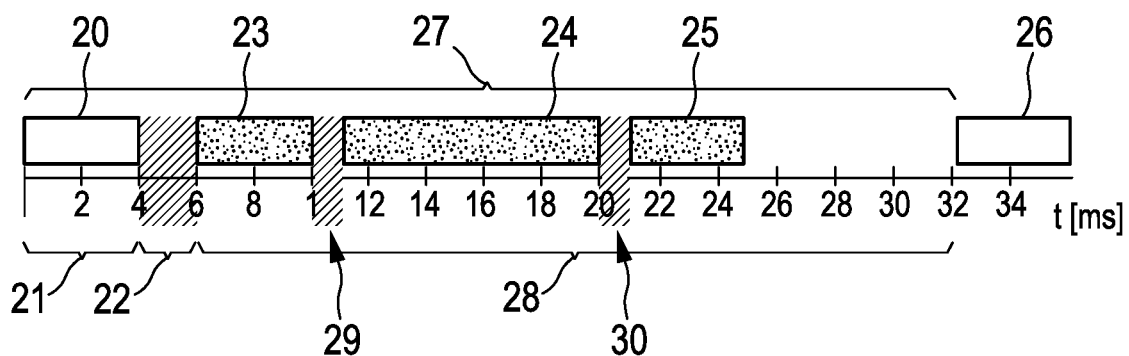
FIG. 4 illustrates a frame used for the communication between the communication device and the sensors.

FIG. 4 schematically and exemplary illustrates a frame having a frame time period 27. The frame time period 27 is formed by a transmission time period 21, a switch over time period 22 and a reception time period 28. During the transmission time period 21 the controller 18 controls the transmitter 17 such that the beacon signal 20 is transmitted to the different sensors 4. This beacon signal 20 is used for synchronization of the base station 8 with the sensors 4 and contains time information indicating to the individual sensors 4 when they can transmit their signals to the base station 8. The corresponding time slots for, in this example, three different sensors are indicated by boxes 23, 24, 25. These time slots are within the reception time period 28 and during these time slots the respective sensors transmit their signals to the base station 8. In between these time slots 23, 24, 25 are temporal gaps 29, 30, in order to allow the base station 8 to clearly distinguish between the different signals received from the different sensors. Moreover, the switch over time period 22 between the transmission time period 21 and the reception time period 28 is used for allowing the base station 8 for switching from the transmission operation to the reception operation. After the frame has been completed, the next frame starts with a next beacon signal 26. Preferentially, the transmission time period 21 is smaller than 10 percent of the frame time period 27 such that for the much larger part of the frame the base station 8 is in a reception operation. Carrying out this communication protocol is done in the second mode.

During the reception time period 28 the base station 8 is waiting for responses of the assigned sensors 4, wherein during this time the LNA 16 is susceptible to saturation if strong transmitters are in proximity. Thus, if a second base station in close proximity starts transmission of a beacon signal during the reception time period 28 of the base station 8 which can be regarded as being a first base station, the reception of the signals from the sensors 4 by the first base station 8 is disturbed. This disturbance is also present, if the first base station 8 with the assigned sensors 4, which can be regarded as being first sensors, and the second base station with the assigned sensors, which might be regarded as being second sensors, use different channels within a same frequency band.

The base station 8 and the sensors 4 comprise further components like band filters, which are well known to the person skilled in the art of wireless communication and which are therefore not shown in FIGS. 2 and 3. Band filtering is preferentially carried out, after the received signal has been amplified by the LNA 16, such that the susceptibility to saturation of the LNA 16 of the base station 8 has nothing to do with a tuning of the reception operation. In other words, the signal strength value is a good indicator for the time schedule of transmitting and receiving carried out by the second base station, even if the first base station and the second base station use different channels in a same frequency band for their communication with the respective assigned sensors.

Figure 5:
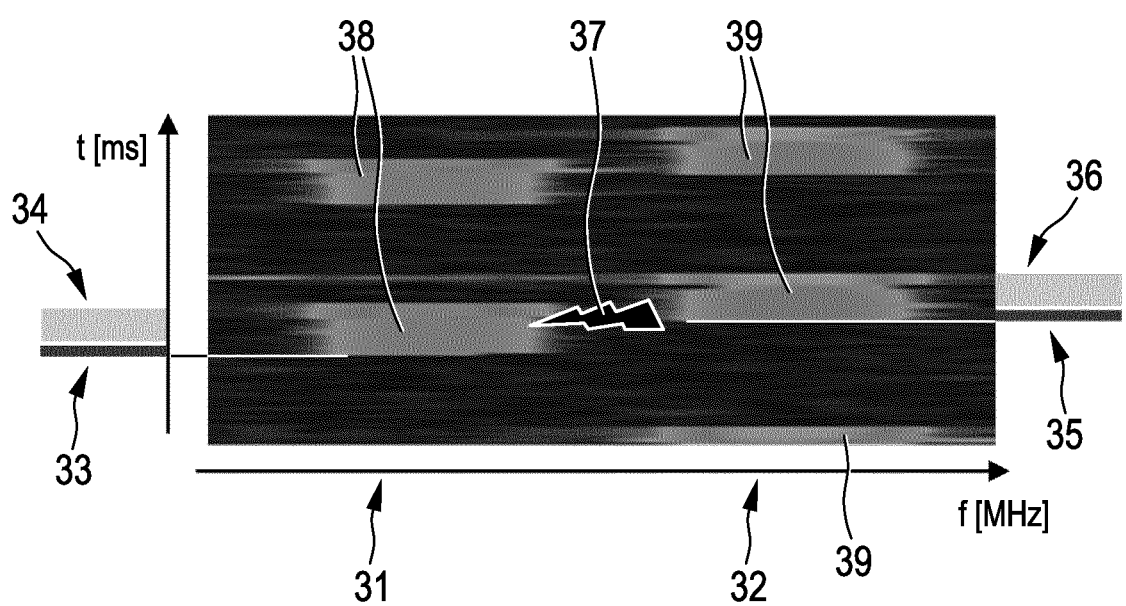
FIG. 5 illustrates schematically and exemplarily an interference between different communication devices of different sensing systems.

FIG. 5 schematically and exemplarily illustrates a recording of a real situation with a spectrum analyzer, if the first base station 8 is used and simultaneously a further, second base station is used. In particular, FIG. 5 shows the signal intensity for different frequencies f and different times t, wherein reference sign 31 indicates the channel used by the first base station 8 and reference sign 32 indicates a second channel used by the second base station. Moreover, reference sign 33 indicates a transmission time period of the first base station 8, reference sign 34 indicates a transmission of a wireless sensor to the first base station 8, reference sign 35 indicates a transmission time period of the second base station and reference sign 36 indicates a transmission of a wireless sensor to the second base station. The symbol 37 indicates that the transmission performed by the second base station disturbs the reception performed by the first base station 8, because the second base station transmits signals during the reception time period of the first base station 8.

FIG. 5 hence illustrates the frequency band occupation over time of two different networks, i.e. of two different base stations with their assigned sensors. The spacing between the respective channels is about 150 kHz in this example. The regions 38 indicate transmission activity of the first base station or of the assigned first sensors and the regions 39 indicate transmission activity of the second base station or of the assigned second sensors.

In this illustration both networks are free running and the time of transmission is random for each network. This is naturally the case when wireless sensors from different patients are applied at different times. This example illustrates the unwanted condition that in this case the second base station starts transmission exactly when the first base station is in a reception operation. This unwanted condition cannot be prevented as long as the two networks do not know anything about each other.

For this reason, the controller 18 is adapted to use the signal strength values determined over time, i.e. in this embodiment the RSSI level determined over time, for controlling the transmission and reception of the first base station, in order to synchronize the transmission and reception of the first base station and the assigned first sensors with the transmission and reception of the second base station and the assigned second sensors. If two or more networks, each comprising a base station and assigned sensors, are used in close proximity, i.e. such that they influence each other, all base stations should be forced to use a simultaneous transmit and receive cycle. This can be achieved, if all base stations use a same communication protocol like the communication protocol described above with reference to FIG. 4 and if the controller 18 as described above with reference to the first base station 8 is used. A corresponding synchronized behavior is illustrated in FIG. 6.

Figure 6:
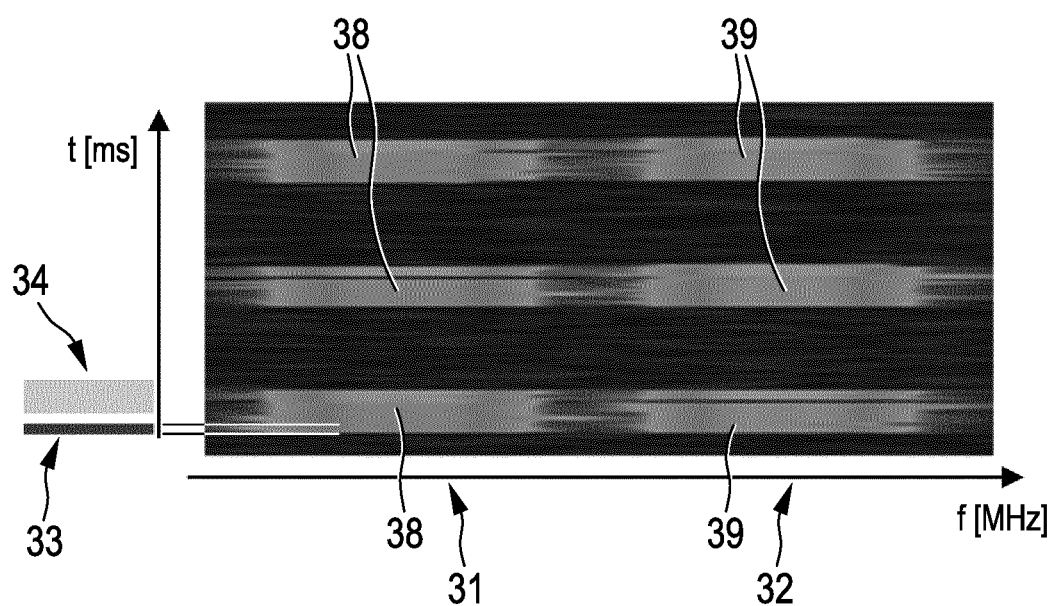
FIG. 6 illustrates schematically and exemplarily a synchronized operation of the two communication devices.

In FIG. 6 reference sign 33 indicates the transmission time period of the first base station 8 and of the second base station and reference sign 34 indicates the reception time period of the first base station 8 and of the second base station, i.e. in this example these time periods are the same for both base stations. Correspondingly, the regions 38 indicating the transmitting activity of the first base station or the first sensors and the regions 39 indicating the transmission activities of the second base station or the second sensors are synchronized in FIG. 6. Switching the base stations from transmission operation to reception operation happens at the same time such that a mutual interference is not possible any more.

The base stations, which should be synchronized, comprise the same radio scheme, i.e. the same communication protocol. That means they comprise the same distribution of transmission time period and reception time period within a same frame time period used in the second mode. For carrying out the synchronization the RSSI level can be intermittently measured, i.e. determined based on the signals received by the receiver 15 and amplified by the amplifier 16. Thus, a corresponding radio chip of the first base station 8 can be used to measure and analyze the RSSI level in the first mode. If the LNA 16 is forced into saturation, for example by a transmitting second base station in close vicinity, this saturation is observable in a change of the RSSI level. As mentioned above, the reception operation, i.e., for instance, a corresponding radio chip, does not need to be tuned to the frequency of the interferer, i.e., for instance, to the channel used by the second base station. It is sufficient to record the RSSI signal on the own radio channel over a certain time. This reduces the timely effort for saturation detection dramatically, because no scan for each individual channel is necessary.

Figure 7:
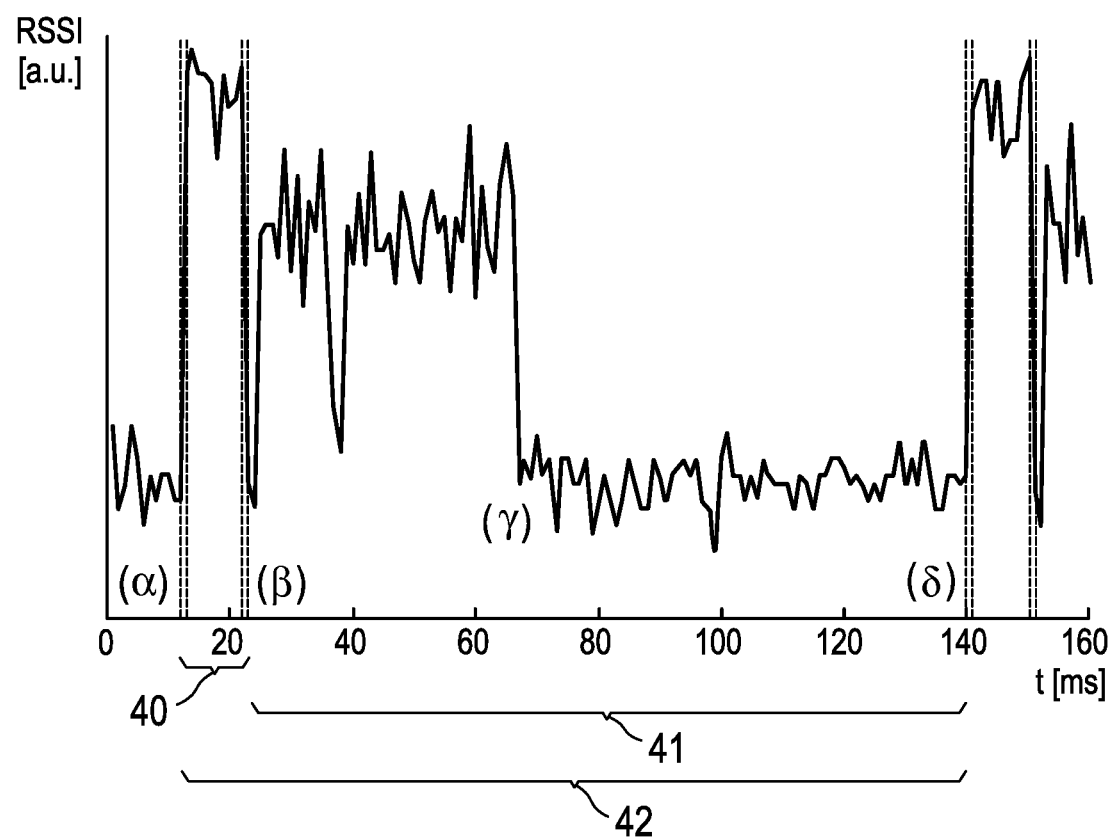
FIG. 7 shows schematically signal strength values over time.

FIG. 7 schematically and exemplarily illustrates an RSSI level in arbitrary units over time t. As can be seen in this figure, at the temporal position ($\alpha$) is a steep increase of the RSSI level indicating a beginning of a transmission time period of the second base station being in close vicinity of the first base station 8. The frame with the transmission time period and the reception time period of the second base station leads to a predefined pattern in the RSSI level over time, wherein this predefined pattern repeats with the repeating frame 42 of the second base station and wherein this repeating pattern starts with a steep increase of the RSSI level indicating the beginning of the transmission time period of the second base station, whereafter the RSSI level is relatively constant until there is a steep drop at the temporal position ($\beta$) indicating the end of the transmission time period 40 of the second base station. The temporal length 40 between the steep increase of the RSSI level at ($\alpha$) and the steep drop of the RSSI level at ($\beta$) corresponds to the transmission time period of the second base station. Thus, the beginning of this predefined pattern can be detected in the RSSI level determined over time by determining at which time the rise, i.e. the derivative, of the RSSI level is larger than a predefined threshold and/or at which time the absolute value of the RSSI level is larger than a predefined threshold. The derivative of the RSSI level can be defined by following equation:

$$x = \frac{\Delta RSSI1}{\Delta t} \text{ with}$$

$$\Delta RSSI1 = RSSI @ t2 - RSSI @ t1 \text{ and}$$

$$\Delta t = t2 - t1$$

The derivative x can therefore be used as a trigger signal to start the pattern detection. The pattern detection at least includes a detection of a temporal position of a beginning of a predefined pattern in the signal strength values, i.e. in the RSSI level in this embodiment, which are determined over time, wherein the transmitter 17 for transmitting signals to the sensors 4 and the receiver 15 for receiving signals from the sensors 4 are controlled based on the determined temporal position. In an embodiment the predefined pattern is determined in the signal strength values determined over time in accordance with FIG. 8 showing a flowchart which will be explained in the following.

In step 101 the RSSI level is measured and stored in a history buffer, i.e. the controller 18 determines the RSSI level and comprises a history buffer in which the determined RSSI level is stored. This determination of the RSSI level is carried out continuously at several subsequent time points, wherein the temporal distance between two subsequent time points is Δt. Moreover, in step 102 the controller 18 determines whether the derivative x is larger than a first threshold. If this is not the case, the method continues with step 101. Otherwise, the method continues with step 103. Thus, the RSSI level is continuously determined and the derivative x is continuously calculated, wherein it is continuously checked whether the derivative x is larger than the first threshold, wherein these steps are continued until the derivative x is larger than the first threshold. In this case, as mentioned above, the method continues with step 103. After a predefined waiting time, which corresponds to the beacon time, i.e. to the transmission time period which is known and the same for all base stations which could disturb each other, a steep falling edge of the RSSI level is expected. In FIG. 7 this steep falling edge is indicated by (β). During this waiting time the RSSI level is again continuously measured every Δt. In FIG. 8 this is indicated by the element 103. In step 104 the controller 18 determines whether the negative derivative −x is larger than a second threshold at the end of the waiting time, wherein, if this is not the case, the method continues with step 101. Otherwise, the method proceeds with step 105.

Figure 8:
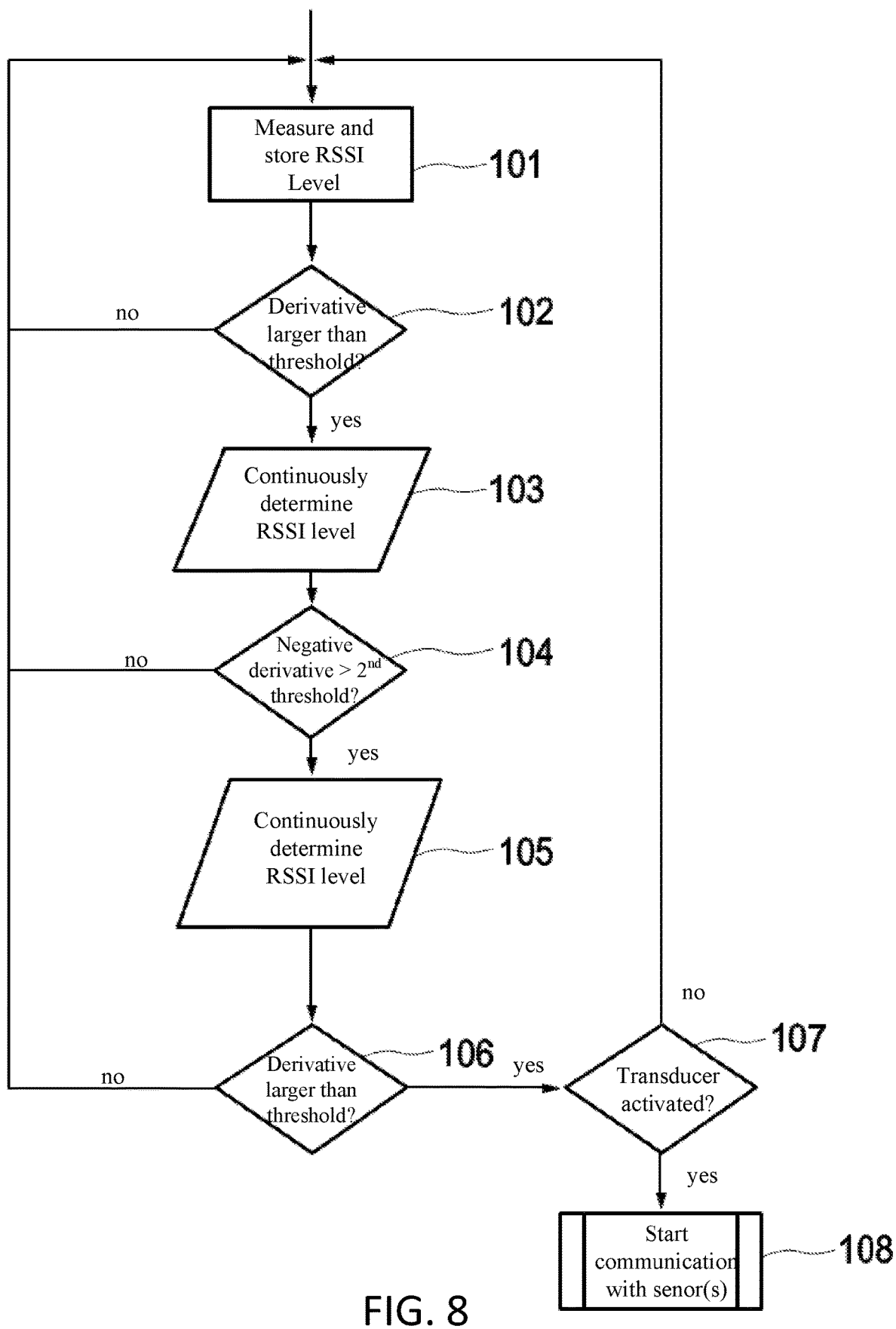
FIG. 8 shows a flowchart exemplarily illustrating an algorithm for detecting a predefined pattern in the signal strength values determined over time.

Since the beacon time, i.e. the transmission time period, for the different networks, i.e. for the different base stations which might be in conflict, are always identical, the algorithm, i.e. the method indicated in FIG. 8, expects a drop in the RSSI level at the temporal position (β) which corresponds to the rise in the RSSI level at the temporal position (α). This is the moment when the radio chip of the other base station, i.e. of the second base station, switches from transmit to receive. This moment therefore corresponds to the switch over time period 22 indicated in FIG. 4, wherein after this switch over time period at the second base station the reception time period starts at the second base station. During this reception time period the second sensors, which are assigned to the second base station, are allowed to transmit data, i.e. the sensing signals, in a sequence predefined by the second base station, wherein the second sensors have been informed by the second base station about this sequence by sending the beacon signal during the transmission time period. In particular, the sequence predefines for each sensor which part of the reception time period can be used by the respective sensor. This can change dynamically within the frame time period with every beacon signal sent from the second base station. Since the sensors are typically worn on the body, they are not necessarily in the immediate vicinity of the associated base station. The distance between sensors and base station is more or less noticeable in a slight drop of the RSSI level.

The time period, during which the sensors transmit signals to the second base station, reaches from the temporal position (β) to the temporal position (γ) in the example shown in FIG. 7. In this example the time between the temporal position (γ) and (δ) is unused. The RSSI level therefore drops back to the noise level. At the temporal position (δ), which has a temporal distance 41 to the temporal position (β), a new frame of the second base station starts with a transmission of a further beacon signal, i.e. with the transmission time period. Correspondingly, the RSSI level has a rising edge such that the first base station 8 knows that the second base station has started with the new frame.

The algorithm illustrated in FIG. 8 therefore waits the known time frame period minus the known transmission time period and then measures the RSSI level every Δt in step 105. Then, in step 106, it is again checked whether the derivative x is larger than the first threshold, in order to detect the beginning of the new frame at the second base station. If the derivative is not larger than the first threshold, the method continues with step 101. Otherwise, the method proceeds with step 107. If at the detected temporal position (δ) of the predefined pattern in the RSSI level any sensor 4 assigned to the first base station 8, i.e. any first sensor, is ready for activation, the first base station 8 can now start the transmission of the beacon signal, i.e. it can start its transmission time period. Thus, in step 107 the controller 18 determines whether a transducer is activated, wherein, if this is the case, the communication with the sensors is started in step 108. Otherwise, the method proceeds with step 101.

In order to determine whether a transducer is activated, i.e. whether a sensor is ready for the communication with the base station 8, it can be assumed that the sensor is ready for communication, if it is not docked to the base station 8, i.e. after pairing and undocking from the base station 8. For this detection whether the sensor is docked to the base station 8 or not, many techniques can be used. For instance, a reed switch might be used together with a magnet. Moreover, while the sensor is docked to the base station, there is preferentially also a wired or radio link data connection between the sensor and the base station, wherein an interruption of this data connection can indicate that the sensor is not docked and hence activated.

In step 108 both base stations, i.e. both networks, transmit at the same time and thereby avoid a mutual saturation of the LNA. By determining the temporal position (δ) of the beginning of the predefined pattern in the RSSI level, which corresponds to the frame of the second base station, it can be ensured that the beginnings of the repeating frame time periods of the first base station 8 are aligned with the determined temporal position (δ) plus a multiple of the temporal length of the frame time period, which in turn ensures that the frames of the first and second base stations are synchronized.

In FIG. 8 only one possible way of RSSI level surveillance and pattern recognition has been illustrated. It is of course also possible to use other RSSI level surveillance and pattern recognition techniques for synchronizing the first base station with the second base station and optionally with further base stations having the same frame time periods and transmission and reception time periods within the frame time periods. A possible alternative variant is illustrated in FIG. 9.

Figure 9:
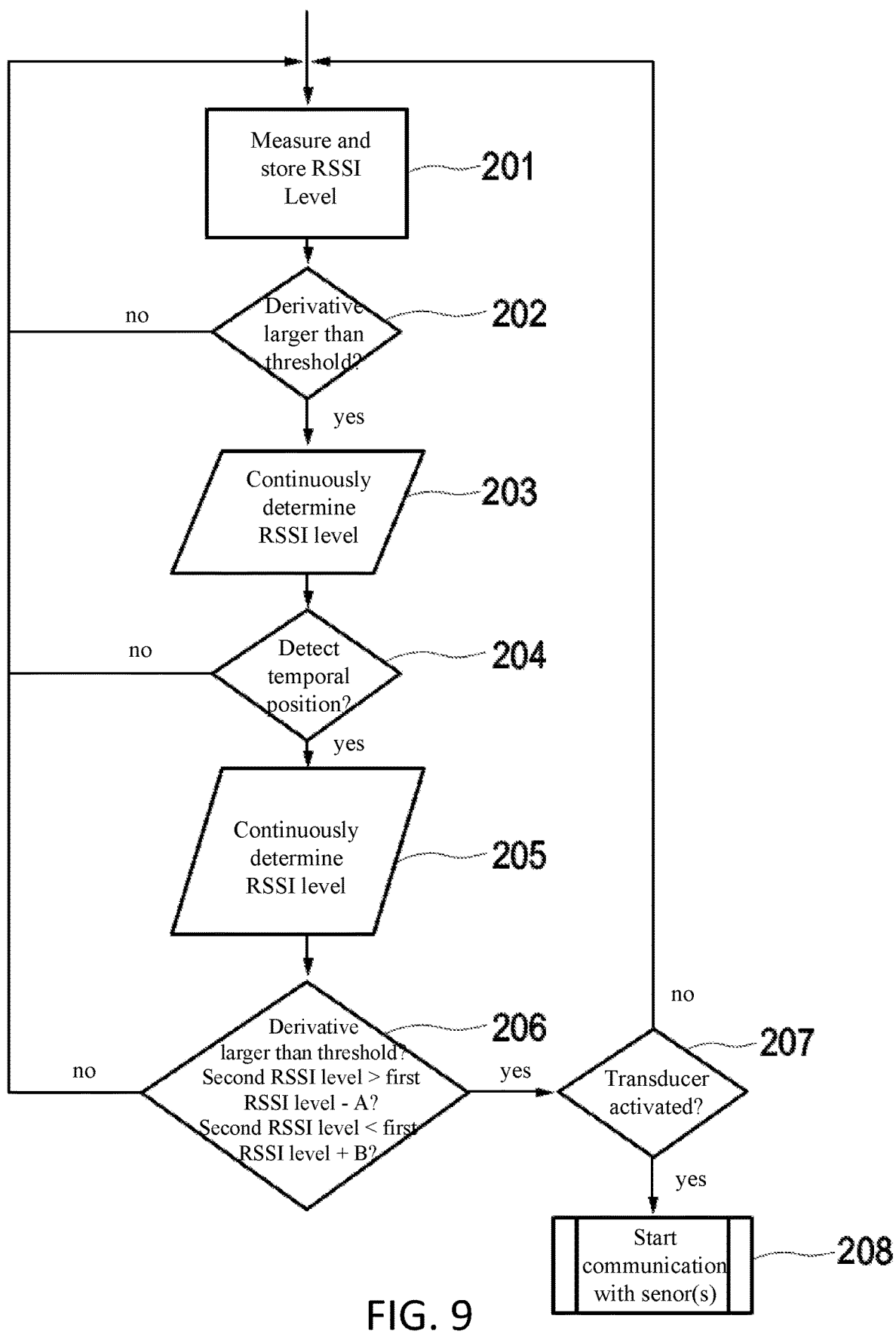
FIG. 9 shows a flowchart exemplarily illustrating another algorithm for detecting the predefined pattern in the signal strength values determined over time.

In FIG. 9 steps 201 and 202 correspond to steps 101 and 102. In step 203 it is waited for the beacon time, i.e. for the transmission time period, and the RSSI level is measured every Δt and the RSSI level is stored. For instance, an average of the RSSI level within the time period 40 indicated in FIG. 7 can be stored. This stored RSSI level can be named first RSSI level. Step 204 corresponds to step 104, i.e. in step 204 the steep falling edge at the temporal position (β) is detected. If this steep falling edge has been detected, the method continues with step 205, wherein in step 205 it is waited for the remaining part of the frame time period, i.e. it is waited for the frame time period minus the transmission time period, and every Δt the RSSI level is measured. Moreover, the average of the RSSI level within the time period between (β) and (δ) is stored, wherein this stored average RSSI level is named second RSSI level.

In step 206 it is determined a) whether the derivative x is larger than the first threshold, b) whether the second RSSI level is larger than the first RSSI level minus a constant A and c) whether the second RSSI level is smaller than the first RSSI level plus a constant B. If all of these conditions are fulfilled, the method proceeds with step 207. Otherwise, the method continues with step 201. The constants A and B are predefined and determined, for instance, by calibration. Steps 207 and 208 correspond to steps 107 and 108.

Since the base stations are not mobile and fixed to a defined location, the values of two consecutive beacons should not be significantly different. Strong fluctuations of consecutive peak or average values could be an indicator of a network which operates further away which is not really suitable for synchronization. Thus, in an embodiment the controller can be adapted to, if operated in the first, listening mode, determine a variation value being indicative of a variation of the average signal strength values in different frame periods, wherein in a respective frame period the average signal strength value is the average of the signal strength values between the steep increase and the steep drop of the signal strength values. In other words, in FIG. 7 the average of the signal strength values between the positions ($\alpha$) and ($\beta$) is calculated, in order to determine the signal strength value average for this frame, wherein these average values are determined for several frames and then the variation like the statistical variance of these average values is determined. The resulting variation value can be used by the controller for determining whether the signal strength values currently measured over time are suitable for the synchronization. For instance, the controller can determine whether the variation value is smaller than a predefined variation threshold, wherein, if this is the case, the controller can determine that the signal strength values currently measured over time are suitable for synchronization, wherein only then the controller might use the signal strength values measured over time for controlling the transmission and reception in the second mode. The variation threshold can be predetermined by calibration.

Moreover, in an embodiment the communication device, i.e. in the above described embodiment the base station, does not have a) a fixed frame time period and/or b) a fixed transmission time period and/or c) a fixed reception time period, but at least one of these time periods is adaptable in accordance with the signal strength value determined over time in the first mode. For instance, in the second mode the frame time period and/or the transmission time period within the frame time period can be determined based on the signal strength value determined over time in the first mode, wherein the transmitter and receiver of the communication device can be operated in accordance with the determined frame time period and the determined transmission time period.

The sensing system including the base station 8 and the sensors 4 is preferentially a cardiotocography (CTG) system comprising two or more sensors. However, the sensing system can also be configured to measure other physiological signals or even non-physiological signals.

If many similar wireless networks are grouped together in a confined space, the proximity of a strong transmitter to another receiver may cause saturation of the amplifier, i.e., for instance, of the LNA. This saturation can lead to system instabilities or a total breakdown of one or more wireless network systems. The sensing system described above provides a possibility to use several medical networks in a small space without disruption by synchronizing them.

The sensors of the sensing system are wireless sensors which can measure various parameters especially in the area of patient monitoring. The sensors are preferentially small autonomous devices which are placeable individually at optimal locations on the body of a patient. The wireless sensors are associated via a wireless network with the base station of the sensing system that controls the radio communication of the sensors. For convenience purposes the base station may be partially or completely integrated into a patient monitor. Such a patient monitor is exemplarily and schematically illustrated in FIG. 10.

Figure 10:
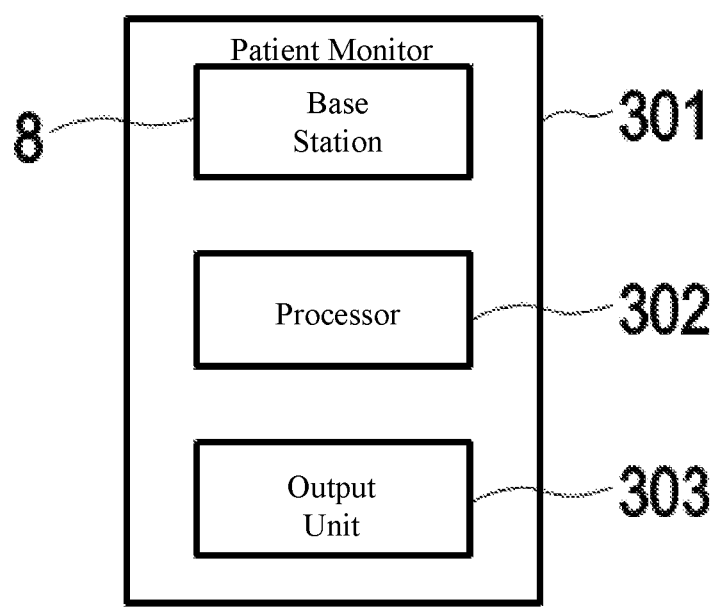
FIG. 10 shows schematically and exemplarily an embodiment of a patient monitor with a communication device.

In FIG. 10 the patient monitor 301 comprises the base station 8 for wirelessly communicating with the sensors 4 and a processor 302 for determining physiological values based on the signals transmitted from the sensors 4 to the base station 8. The patient monitor 301 further comprises an output unit 303 like a display, an acoustical output unit, a printer, et cetera for outputting the determined physiological values. The patient monitor 301 can be adapted to be responsible for displaying, alarming and/or documenting the parameters, i.e. the physiological values, monitored by using the sensors 4.

The benefits of wireless sensors are particularly important in the area of obstetrics. In this situation many different parameters of a mother and an unborn child can be noninvasively measured at different locations on the body of the pregnant woman. For a good, largely pain-reduced birth progress wireless sensors are optimal, because they allow the woman significantly more freedom of movement. For instance, the sensor network described above with reference to FIG. 1 can be used during labor and delivery. In FIG. 1 the two sensors 4 are kept in place with elastic belts 6, wherein these sensors 4 can be configured to measure various parameters like the above mentioned fetal heart rate and the uterine activity, but also further parameters like the maternal heart rate.

In an embodiment the sensors are waterproof such that they can be used under water, for example, in a bathtub or under the shower. The sensing system can therefore be configured to use frequencies for which the attenuation of radio transmission in water is relatively low. In particular, the sensing system is preferentially not configured to use the 2.4 GHz ISM band which is used by ZigBee, Bluetooth, WiFi IEEE 802, et cetera. Instead, the sensing system is preferentially configured to use a sub GHz range frequency band. In an embodiment the sensing system is configured to use the ISM band at 433 MHz in Europe and some other regions or the WMTS band at 608 MHz in the US or the T108 band at 920 MHz in Japan.

As mentioned above, the sensors can be configured to be used in obstetrics, wherein the sensors include preferentially an ultrasound Doppler sensor which is configured to, for instance, monitor the heart activity of the unborn child. This sensor is noninvasive, easy to use and provides direct acoustic feedback when searching for the optimum placement position. Since the exact location of the fetal heart is not necessarily known at the beginning of a measurement, the heart must be localized by moving the sensor on the abdomen of the woman. For this search it is preferred to have the acoustic feedback almost instantaneously and without delay. Standard communication protocols in the 2.4 GHz band like ZigBee, Bluetooth, et cetera do not meet this requirement. In particular, these standard communication protocols allow a simple construction of a radio network with many participants, but they are unsuitable for the transmission of realtime data like audio sounds, because of the undefined delay times and repetition mechanisms of lost data packages. The sensing system described above especially with reference to FIG. 1 does therefore not use the standard communication protocols, but the communication protocol with the frames including the transmission time periods (beacon signal periods), the switch over time period and the reception time period as described above. This protocol uses preferentially a TDMA method to ensure a safe and time predictable transmission of ultrasound Doppler signals. In order to keep the sensors small and lightweight, radio chips comprising the transmitters and receivers are integrated in the sensors, wherein these radio chips can be programmed to different radio frequencies. Preferentially, different radio channels are assigned to different sensing systems, in order to reduce the likelihood of mutual interferences. This assignment of a radio channel can be done either with a fixed setting during installation or dynamically self-organized by the respective base station. Moreover, the sensors are preferentially configured to be used with any base station covering the same channel. The sensors and the base station can be configured such that the sensors can be docked to the base station, wherein, if the sensors are docked to the base station, the base station distributes communication information for the communication with this base station to the sensors, wherein the corresponding data connection can be a radio link or a wired data connection. For instance, the base station can inform the docked sensors with respect to the used channel. Also information regarding the frame time period might be provided to the docked sensors. Since the communication between the sensors involved in the respective network, i.e. involved in the respective sensing system, and the base station is bidirectional, information exchange between the sensors and the base station is possible any time, i.e. also if the sensors are not docked to the base station, and can be used, for instance, to dynamically change the channel during runtime if the radio link conditions deteriorate, i.e. the sensors and the base stations can be configured for using "smart hopping".

If the sensing systems described above with reference to, for instance, FIG. 1 were not used, detailed instructions for frequency planning, setting up several base stations and defining distances between two or more sensing systems, especially between two or more base stations, could be provided by, for instance, a manufacturer, in order to avoid intermodulation and LNA saturation. Nevertheless, in daily practice corresponding guidelines might not be followed always due to disregarding the instructions for installation, missing training, insufficient planning and preparation prior to installation, time pressure, space limitations due to structural conditions, et cetera. If these guidelines are not followed and if then, for instance, the separation distance between two base stations of two different sensing systems, i.e. of two different networks, is smaller than instructed, the amplifier of one of the base stations, i.e. the input amplifier, can reach its saturation level, if it is operated for reception and the other base station in proximity is transmitting at the same time, wherein saturation of the amplifier means that the disturbed base station can no longer receive the radio signals from the sensors assigned to it. This is due to the fact that an input filter of a receiver must cover the whole band and cannot suppress adjacent channels. As a result, the radio network would break down partially or completely. This saturation of the amplifier is inherent in the principle of the radio receiver and cannot be influenced by hardware measures such as band filters or attenuators without compromising the overall performance of the respective network. For these reasons, the sensing system described above with reference to, for instance, FIG. 1 allows to avoid the saturation conditions of the amplifier in order to ensure the coexistence of several sensing systems in a small space in close proximity, wherein this avoidance is reached by synchronizing the transmission and reception of the different base stations based on the signal strength values determined over time.

The wireless sensors are preferentially energized by using a rechargeable battery, wherein the sensors and the base station are adapted such that the base station charges the respective battery, if the respective sensor has been docked to the base station. The base station can comprise corresponding docking places 9 of a charging unit 19, which are schematically and exemplarily illustrated in FIG. 3. The controller 18 can be configured to be operated in the first mode, i.e. to determine the signal strength values over time for providing a trigger signal for synchronizing the transmission and reception operation of the base station 8 with the transmission and reception operation of a neighboring base station, if the charging unit 19 charges a sensor. This can be beneficial, because during a charging operation generally the sensors do not measure physiological signals to be sent to the base station. Thus, the measurement time is not reduced by operating the controller 18 in the first mode.

The sensors can be configured to turn off the radio transmission, if they are docked, independently of whether they are charged or not, in order to reduce power consumption and wireless traffic.

Figure 11:
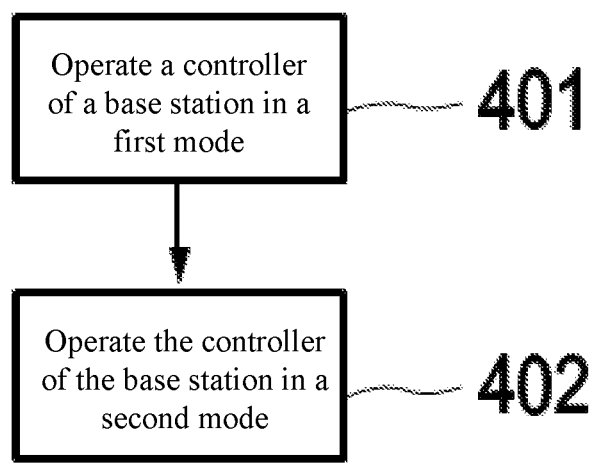
FIG. 11 shows a flowchart exemplarily illustrating an embodiment of a method for operating a communication device for wirelessly communicating with sensors.

In the following an embodiment of a method for operating a base station for wirelessly communicating with sensors will exemplarily be described with reference to a flowchart shown in FIG. 11.

In step 401 the controller 18 of the base station 8 is operated in the first mode, wherein the receiver 15 of the base station 8 receives signals over time and determines signal strength values over time, wherein a signal strength value is indicative of a strength of the amplified received signal. In step 402 the controller 18 of the base station 8 is operated in the second mode, wherein the transmitter 17 of the base station 8 transmits signals to the sensors 4 and the receiver 15 of the base station 8 receives signals which have been transmitted from the sensors 4 to the base station 8 based on the signals transmitted from the sensors 4 to the base station 8. This transmitting of the signals from the base station 8 to the sensors 4 and the receiving of the signals from the sensors 4 by the base station 8 are controlled based on the signal strength values determined over time.

For avoiding the interference between neighboring sensing systems the base station does not use any higher-level control instance, i.e. the synchronization of closely spaced individual networks does not use any higher-level control instance. Networks, i.e. sensing systems, of a same class are identified on air by using a finger print, i.e. by using the pattern in the signal strength values determined over time, that only applies to networks of this class. It is not required to have any superordinate hardware or processing unit with separate communication connections between the individual networks of the same class. Especially for medical networks the likelihood of a collision with different transmission techniques like ZigBee, Bluetooth, WiFi, et cetera is relatively low because the sensing systems described above with reference to, for instance, FIG. 1 can use other reserved frequency bands. For this reason, we only have to take care about interferences created by networks of the own class, which use different channels within a same frequency band. A self-organizing approach is provided which does not need any superordinate coordinator module or separate communication or trigger lines.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage.

Procedures like the controlling of the receiver and the transmitter, the determination of the signal strength values over time, et cetera performed by one or several units or devices can also be performed by any other number of units or devices. These procedures and/or the control of the base station in accordance with the method for operating a base station can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a communication device for wirelessly communicating with a sensor. The communication device comprises a receiver for receiving signals, an amplifier for amplifying the received signals, a transmitter for transmitting signals, and a controller. The controller is operable in a first mode in which signal strength values are determined over time, which are indicative of a strength of an amplified received signal, and in a second mode in which signal transmission and reception are controlled based on the determined signal strength values. The determined signal strength values can be indicative of, for instance, a saturation of the amplifier caused by a transmission operation of another, neighboring communication device such that, by considering the determined signal strength values, the transmission carried out by the communication device can be synchronized with the corresponding operation of the neighboring communication device. This can lead to reduced disturbances.

The invention claimed is:

1. A communication device for wirelessly communicating with a sensor, the communication device comprising:
   a receiver to receive signals,
   an amplifier to amplify the received signals, and to generate the amplified received signals,
   a transmitter to transmit the amplified received signals, and
   a controller to control the receiver and the transmitter, wherein the controller is operable in a first mode, in which the controller controls the receiver to receive the amplified received signals over time and determines signal strength values over time of the amplified received signals, wherein a signal strength value of an amplified received signal of the signal strength values of the amplified received signals is indicative of a strength of the amplified received signal, and in a second mode in which the controller controls the transmitter to transmit to the sensor and the receiver to receive the amplified received signals based on the determined signal strength values of the amplified received signals, wherein the controller is adapted to determine a temporal position of a beginning of a predefined pattern in the signal strength values of the amplified received signals, which have been determined over time, and to control the transmitter to transmit to the sensor and the receiver to receive the amplified received signals from the sensor based on the determined temporal position of the beginning of the predefined pattern in the signal strength values,
   wherein the communication device is associated with a first network, and a second communication device is associated with a second network, wherein both the first and second networks are free running and a time of transmission for both the first and second networks is random, wherein the controller is further to use the determined signal strength values of the amplified received signals over time to synchronize communication of the communication device over the first network with the second communication device over the second network that is distinct from the first network.

2. The communication device is defined in claim 1, wherein the controller is configured to determine received signal strength indicator (RSSJ) levels as the signal strength values of the amplified received signals.

3. The communication device is defined in claim 1, wherein the controller and the receiver are configured such that in the first mode and in the second mode a same frequency channel within a same frequency band are used during a signal reception.

4. The communication device is defined in claim 1, wherein the controller is configured such that the determination of the temporal position includes determining when at least one of following conditions is fulfilled: a) a signal strength value of the signal strength values of the amplified received signals is larger than a predefined first threshold and b) a derivative of the signal strength values of the amplified received signals is larger than a predefined second threshold value.

5. The communication device is defined in claim 1, wherein the controller is configured to control the receiver and the transmitter such that during a predefined transmission time period communication from the transmitter to the sensor is performed and during a later predefined reception time period communication from the sensor are received by the transmitter, wherein the transmission time period communication and the reception time period communication are parts of a frame time period which is continuously repeated, wherein a beginning of the frame time period which is continuously repeated is aligned with the determined temporal position plus a multiple of a temporal length of the frame time period.

6. The communication device as defined in claim 1, wherein the communication device further comprises a charging unit to charge the sensor, wherein the controller is configured to be operated in the first mode, if the charging unit charges the sensor.

7. The communication device as defined in claim 1, wherein the controller is configured to control the receiver and the transmitter such that a first communication with the sensor uses a time division multiplexing technique or a time division multiple access technique.

8. The communication device as defined in claim 1, wherein the controller is configured to determine the signal strength values of the amplified received signals over time during the second mode, configured to determine if the determined signal strength values of the amplified received signals are larger than a predefined signal strength threshold and/or configured to determine if the determined signal strength values of the amplified received signals have reached their maximum, and configured to switch from the second mode to the first mode depending on whether the determined signal strength values of the amplified received signals are larger than the predefined signal strength threshold and/or depending on whether the determined signal strength values of the amplified received signals have reached their maximum.

9. The communication device as defined in claim 1, wherein the controller is configured to, if operated in the first mode, determine a variation value being indicative of a variation of average of the signal strength values of the amplified received signals, wherein a respective average signal strength value is the average of the signal strength values of the amplified received signals between an increase of the signal strength values of the amplified received signals having a slope being larger than a predefined slope threshold and a following decrease of the signal strength values of the amplified received signals having a negative slope with an absolute value being larger than the predefined slope threshold, and to use the signal strength values of the amplified received signals determined over time for the controller in the second mode only, if the variation value is smaller than a predefined variation threshold.

10. The communication device as defined in claim 1, wherein a patient monitor is to measure and transmit signals being indicative of a physiological property of a patient to the communication device, the patient monitor comprising:
   a processor to determine physiological values based on a first communication from the sensor to the communication device, and
   an output unit to output the determined physiological values.

11. A sensing system comprising:
   a sensor; and
   a communication device to wirelessly communicate with the sensor comprising:
   a receiver to receive signals,
   an amplifier to amplify the received signals, and to generate the amplified received signals,
   a transmitter to transmit the amplified received signals, and
   a controller to control the receiver and the transmitter, wherein the controller is operable in a first mode, in which the controller controls the receiver to receive the amplified received signals over time and determines signal strength values of the amplified received signals over time, wherein a signal strength value of an amplified received signal of the signal strength values of the amplified received signals is indicative of a strength of the amplified received signal, and in a second mode in which the controller controls the transmitter to transmit the amplified received signals to the sensor and the receiver to receive based on the determined signal strength values of the amplified received signals, wherein the controller is adapted to determine a temporal position of a beginning of a predefined pattern in the signal strength values of the amplified received signals, which have been determined over time, and to control the transmitter to transmit the amplified received signals to the sensor and the receiver to receive the amplified received signals from the sensor based on the determined temporal position of the beginning of the predefined pattern in the signal strength values,
   wherein the communication device is associated with a first network and a second communication device is associated with a second network, wherein both the first and second networks are free running and a time of transmission for both the first and second networks is random, wherein the controller is further to use the determined signal strength values of the amplified received signals over time to synchronize communication of the communication device over the first network with the second communication device over the second network that is distinct from the first network.

12. The sensing system as defined in claim 11, wherein the sensor is configured to measure a physiological property of a person.

13. A method for operating a communication device for wirelessly communicating with a sensor, the method comprising:
   operating a controller of the communication device in a first mode, wherein a receiver of the communication device receives signals, amplifies the received signals over time and determines signal strength values of the amplified received signals, which are indicative of a strength of an amplified received signal of the amplified received signals, over time, and
   operating the controller of the communication device in a second mode, wherein a transmitter of the communication device transmits the amplified received signals to the sensor, and the receiver of the communication device receives the amplified received signals which have been transmitted from the sensor to the communication device based on a first communication transmitted from the sensor to the communication device, wherein the first communication from the communication device to the sensor and from the sensor to the communication device are controlled based on the signal strength values of the amplified received signals, wherein the controller determines a temporal position of a beginning of a predefined pattern in the signal strength values of the amplified received signals, which have been determined over time, and controls the transmitter and the receiver based on the temporal position of the beginning of the predefined pattern in the signal strength values of the amplified received signals,
   wherein the communication device is associated with a first network and a second communication device is associated with a second network, wherein both the first and second networks are free running and a time of transmission for both the first and second networks is random, wherein the controller uses the determined signal strength values of the amplified received signals over time to synchronize communication of the communication device over the first network with the communication of the second communication device over the second network that is distinct from the first network.

14. A non-transitory computer readable medium for controlling a communication device for wirelessly communicating with a sensor, the computer readable medium comprising a set of instructions, which when executed by a computing device, cause the computing device to:
   operate a controller of the communication device in a first mode, wherein a receiver of the communication device receives signals, amplifies the received signals over time and determines signal strength values of the amplified received signals, which are indicative of a strength of an amplified received signal of the amplified received signals, over time, and operating the controller of the communication device in a second mode, wherein a transmitter of the communication device transmits the amplified received signals to the sensor, and the receiver of the communication device receives the amplified received signals which have been transmitted from the sensor to the communication device based on a first communication transmitted from the sensor to the communication device, wherein the first communication from the communication device to the sensor and from the sensor to the communication device are controlled based on the signal strength values of the amplified received signals, wherein the controller determines a temporal position of a beginning of a predefined pattern in the signal strength values of the amplified received signals, which have been determined over time, and controls the transmitter and the receiver based on the temporal position of the beginning of the predefined pattern in the signal strength values of the amplified received signals, wherein the communication device is associated with a first network and a second communication device is associated with a second network, wherein both the first and second networks are free running and a time of transmission for both the first and second networks is random, wherein the controller uses the determined signal strength values of the amplified received signals over time to synchronize communication of the communication device over the first network with the communication of the second communication device over the second network that is distinct from the first network.

* * * * *